United States Patent [19]
Anderson

[11] 3,757,099
[45] Sept. 4, 1973

[54] ANALOG SIGNAL TO FREQUENCY SIGNAL CONVERTER

[75] Inventor: Dennis R. Anderson, Warrensville Heights, Ohio

[73] Assignee: Avtron Manufacturing, Inc., Cleveland, Ohio

[22] Filed: July 2, 1971

[21] Appl. No.: 159,250

[52] U.S. Cl.................. 235/194, 307/229, 328/160
[51] Int. Cl............................................. G06g 7/16
[58] Field of Search.................... 235/194, 195, 196, 235/183; 328/144, 127, 128, 129, 132, 15, 28, 29, 66, 67, 78, 140, 160, 161; 307/245, 261, 294, 271, 233, 229; 340/347 A–347 D

[56] References Cited
UNITED STATES PATENTS

| | | | |
|---|---|---|---|
| 3,549,874 | 12/1970 | Vachitis | 235/194 X |
| 3,594,648 | 7/1971 | Rappaport | 328/129 X |
| 3,525,042 | 8/1970 | Nunlist et al. | 235/194 X |
| 3,569,688 | 3/1971 | Brendle | 235/194 |
| 3,605,028 | 9/1971 | De Vries | 235/194 |

Primary Examiner—Joseph F. Ruggiero
Attorney—Yount & Tarolli

[57] ABSTRACT

An analog to frequency converter is disclosed for receiving a first analog signal and a frequency signal to provide a second first frequency signal. Another analog to frequency converter may provide the first frequency signal having a frequency dependent upon the magnitude of another analog signal. Circuitry is provided so that the second frequency will exhibit a frequency proportional to the product of a function of the first and that of the second analog signals.

11 Claims, 4 Drawing Figures

INVENTOR
DENNIS R. ANDERSON

BY Yount and Tarolli
ATTORNEYS

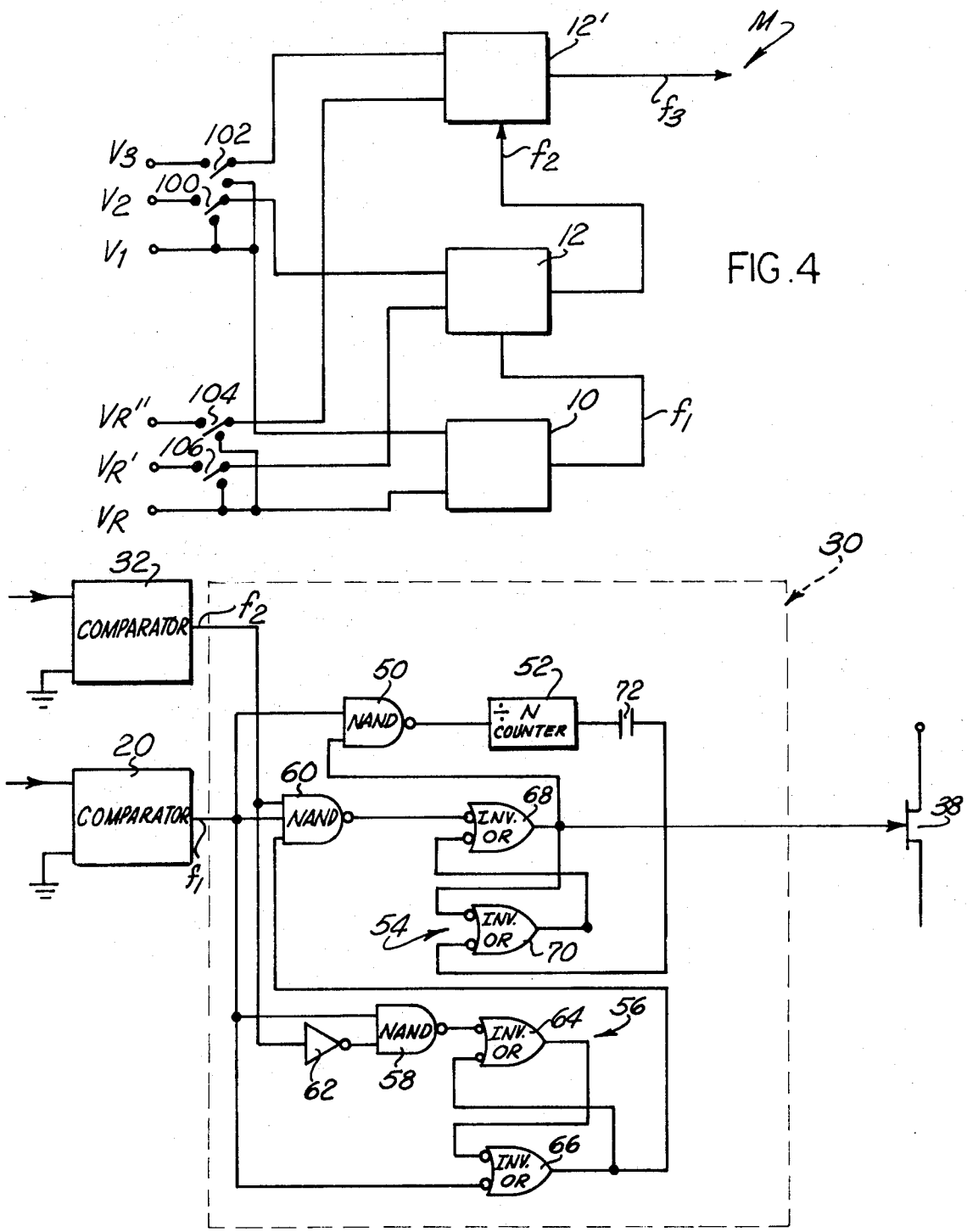

ANALOG SIGNAL TO FREQUENCY SIGNAL CONVERTER

This invention is related to the art of analog to frequency converting circuits and, more particularly, to improved circuitry particularly applicable for multiplying functions of two or more analog signals and providing an output frequency proportional to the magnitude of the product of the functions of the analog signals.

A conventional analog multiplier circuit serves to multiply two analog signals, representative of two quantities, and provides an analog output signal having a magnitude proportional to the product of the two analog input signals. If the output signal is to be transmitted for a substantial distance, as with a cable, then the output signal will be substantially degraded, as by attenuation, so that the signal as received at a remote station will not be an accurate indication of the product of the two quantities involved. To some extent, this problem may be obviated by first converting the analog output signal to a frequency proportional to the magnitude of the analog output signal prior to transmitting the information to a remote station. This, however, does not eliminate variations in the magnitude of the analog output signal resulting from such factors as component variations with temperature changes in the multiplying circuitry which will affect the accuracy of the analog output signal. Consequently, it would be desirable in a system of the nature described thus far that the two analog signals be directly converted into an output frequency signal which exhibits a frequency proportional to the magnitude of the product of the two analog input signals. Such a frequency signal may be accurately transmitted over long distances, as by cables, to a remote station where the frequency signal is then converted into an analog signal accurately representative of the product of the two quantities involved. Such systems find use where it is desired to monitor machinery and display horsepower or wattage readings at remote locations.

The present invention is directed toward analog to frequency signal conversion means, having particular applicability for use in multiplying two or more analog signals so as to obtain an output frequency signal proportional to the product of functions of the analog signals. A function of an analog signal may, for example, be directly or inversely proportional to the magnitude of the analog signal. Hence, the output frequency may be directly proportional to the product of the magnitudes of two signals, or to that of the ratio of the two signals, or to that of the product of the reciprocals of the two signals. The analog signals may be steady state or variable. Further, it is comtemplated that the circuitry of the present invention be used for purposes of multiplying a signal by itself so as to be raised to a second or third or some greater power.

In accordance with one aspect of the present invention a multiplying circuit is provided for purposes of multiplying functions of the magnitudes of first and second analog signals which may be representative of the same or different quantities, and providing an output signal exhibiting a frequency proportional to the product of the functions of the magnitudes of the analog signals. The multiplying circuitry employs a first analog to frequency signal converter for purposes of receiving a first analog signal and providing a first output frequency signal exhibiting a frequency proportional to a function of the magnitude of the first analog signal. A second analog to frequency signal converting circuit is responsive to the second analog signal as well as to the first output frequency signal for providing a second output frequency signal exhibiting a frequency proportional to the product of the functions of the magnitudes of the first and second analog signals.

In accordance with a more limited aspect of the present invention, the second analog to frequency signal converting means includes a charging circuit having an energy storage means, such as a capacitor, for receiving the second analog signal for purposes of charging the energy storage means at a rate dependent upon the magnitude of the second analog signal, together with means, such as a comparator circuit, for providing an output signal when the storage means is charged to a predetermined level. A discharge circuit responds to the output signal for purposes of discharging the energy storage means for a time period dependent upon the frequency of the first output frequency signal so that the output signal of the second analog to frequency converter serves as the second output frequency signal exhibiting a frequency proportional to the product of the functions of the magnitudes of the first and second analog signals.

In accordance with a further aspect of the present invention, the multiplier circuit employs a plurality of second analog to frequency converting circuits, in accordance with the number of multiplications desired, with each of the second converting circuits serving to provide an output frequency signal dependent on the magnitude of an associated analog signal and the frequency of the next preceding analog to frequency signal converting circuit.

In accordance with a still further aspect of the present invention, an improved analog to signal converting circuit is provided having a charging circuit including energy storage means, such as a capacitor, for receiving an analog signal for charging the energy storage means at a rate dependent upon the magnitude of the analog signal. Circuit means provides an output signal pulse when the storage means is charged to a predetermined level and additional circuit means provides a frequency signal. Also, additional circuit means responds to each output signal pulse for purposes of discharging the energy storage means at a substantial constant rate for a time period inversely proportional to the frequency of the frequency signal.

The primary object of the present invention is to provide improved analog to frequency signal conversion circuitry which is relatively inexpensive to manufacture and economical to operate.

A still further object of the present invention is to provide an improved multiplier circuit for multiplying analog signals representative of the same or different quantities, which may be constant or variable, to provide a frequency signal exhibiting a frequency which may be directly or inversely proportional to the product of the analog signals or may be proportional to the ratio of the analog signals.

A still further object of the present invention is to provide improved circuitry for use in such applications as transmitting signals representative of the product functions of two or more analog signals over long distances.

A still further object of the present invention is to provide improved multiplying circuitry for providing a digital output signal representative of the magnitude of the product of two or more constant or variable analog signals.

The foregoing and other objects and advantages of the invention will become more readily apparent from the following description of the preferred embodiment of the present invention taken in conjunction with the accompanying drawings which are a part hereof and wherein:

FIG. 3 is a schematic illustration of a variable time control circuit in accordance with the invention; and, FIG. 4 is a block diagram illustration of additional modifications of the present invention.

Figure 1:
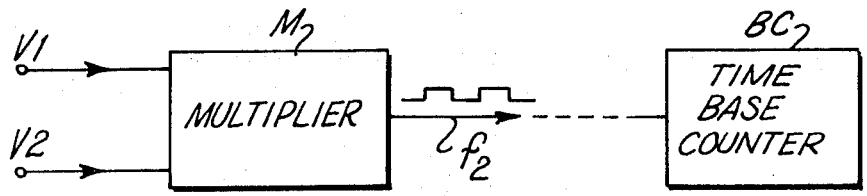
FIG. 1 is a block diagram illustration of one application of the present invention for use in multiplying two analog signals to provide a frequency signal for transmission to a remote station.

Referring now to the drawings wherein the showings are for purposes of illustrating a preferred embodiment of the invention only and not for purposes of limiting same, FIG. 1 illustrates one application of the present invention including a multiplier circuit M, which serves to receive a pair of analog signals $V_1$ and $V_2$, and which provides an output frequency signal $F_2$ which is transmitted, as with a cable, to a remote station at which the frequency signal is received by time base counter BC, of conventional design. Counter BC is used for purposes of converting the received frequency signal $F_2$ into an analog signal indicative of the product of the two analog signals $V_1$ and $V_2$.

Figure 2:
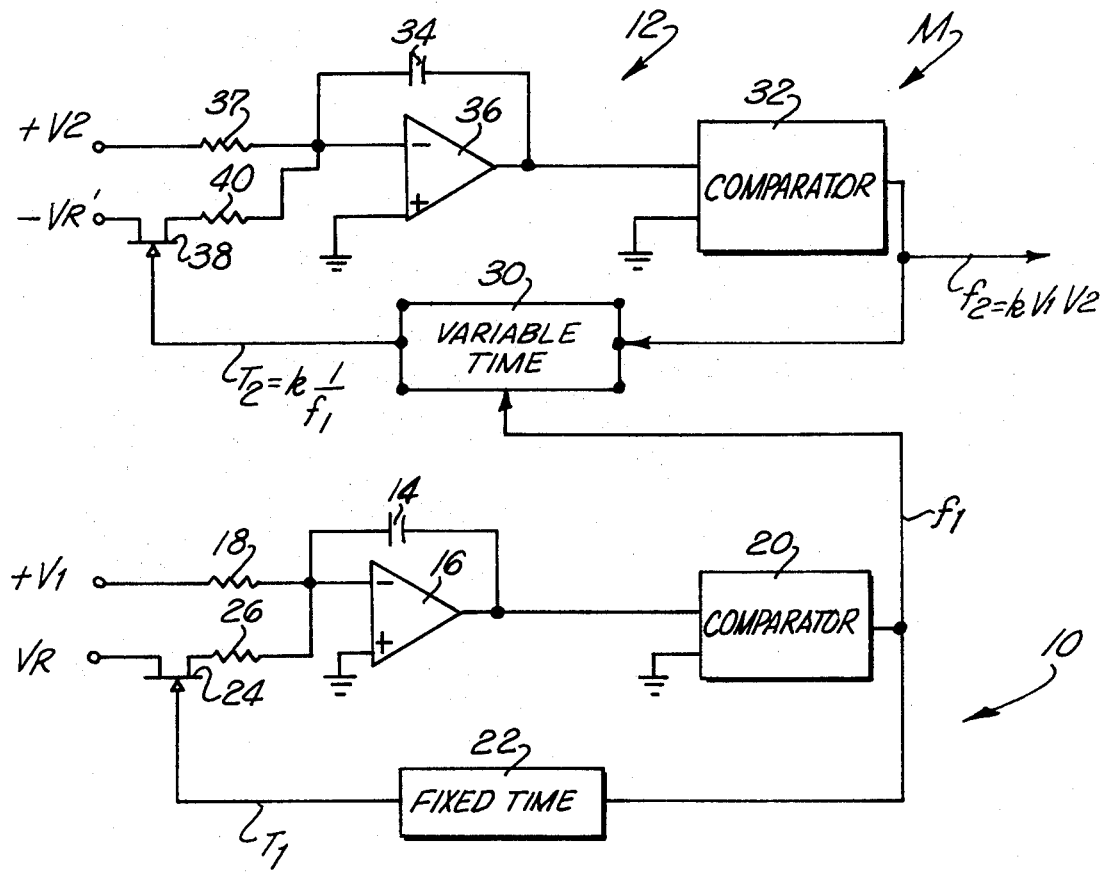
FIG. 2 is a combined schematic-block diagram illustration of one embodiment of the present invention.

Multiplier circuit M preferably takes the form as shown in FIG. 2, and includes a first analog to frequency converter circuit 10 and a second analog to frequency signal converter circuit 12. As will be explained in greater detail hereinafter, converter circuit 10 serves to receive a first analog signal $V_1$ and provides an output frequency signal $F_1$ exhibiting a frequency proportional to the magnitude of analog signal $V_1$. Also, as will be explained in greater detail hereinafter, converter circuit 12 serves to receive frequency signal $F_1$ as well as analog signal $V_2$, and provides an output frequency signal $F_2$ which exhibits a frequency proportional to the product of the magnitudes of analog signals $V_1$ and $V_2$.

Having briefly described the operation of multiplier circuit M, reference is now made to the construction details of converter circuits 10 and 12 shown in FIG. 2. Whereas converter circuit 10 may take various forms of analog to frequency converters, it preferably includes an integrator circuit having an energy storage means in the form of a capacitor 14 connected between the inverting input and the output circuit of a conventional operational amplifier 16. Analog signal $V_1$ is applied through a resistor 18 to the inverting input or summing point of the operational amplifier 16. Consequently, capacitor 14 charges at a rate dependent on the magnitude of signal $V_1$. The output signal of operational amplifier 16 is applied to one input of a conventional comparator circuit 20 which serves to compare the integrated output signal from amplifier 16 with a reference, such as ground potential, and when the amplifier's output signal attains a level equal to ground potential the comparator circuit provides an output signal pulse. This output signal pulse is, in turn, applied to a fixed time circuit 22, which may take any suitable form, such as a one shot monostable oscillator, for purposes of providing an output signal of a fixed time duration for each signal received from comparator 20. The output signal taken from the fixed time circuit 22 is used to actuate a suitable switch, such as a field effect transistor 24, for the fixed time duration for purposes of discharging capacitor 14. Thus, when the field effect transistor 24 is actuated into conduction it connects a reference voltage $V_R$, of opposite polarity from signal $V_1$, through a resistor 26 so that the capacitor 14 discharges for the fixed period of time. Thereafter, the capacitor is then charged at a rate dependent upon the magnitude of analog signal $V_1$ as the cycle repeats itself. The output signal pulses obtained from comparator 20 exhibit a frequency $F_1$ which is proportional to the magnitude of analog signal $V_1$.

Converter circuit 12 is similar to that of converter circuit 10 with the exception of its inclusion of a variable time circuit 30 for receiving output signal pulses from a comparator 32, as well as frequency signal $F_1$ from comparator 20 of converter circuit 10. Thus, converter circuit 12, in a manner similar to that of converter circuit 10, includes energy storage means in the form of a capacitor 34 connected between the inverting input circuit and the output circuit of a conventional operational amplifier 36. The inverting input circuit of the operational amplifier serves as the summing point for the circuit, and is connected through a resistor 37 so as to be connected to a second analog signal $V_2$. The integrated output signal from the output circuit of amplifier 36 is applied to one input of comparator 32 for comparison with a reference potential, such as ground. Each time the output signal of amplifier 36 attains a level equal to the reference potential, then comparator circuit 32 produces an output signal pulse. This pulse is applied to one input of the variable time circuit 30. As will be described in greater detail hereinafter, each time a pulse is received from comparator 32 the variable time circuit 30 provides an output signal for energizing a field effect transistor 38 for a time duration which is inversely proportional to the frequency of frequency signal $F_1$. When field effect transistor 38 is energized into conduction it connects a reference source $V_r'$, of opposite polarity from signal $V_2$, through a resistor 40 to the summing point of operational amplifier 36 so that capacitor 34 discharges for a time duration dependent on the period that the field effect transistor is conducting. Consequently, the frequency of output pulses from comparator 32 will be proportional to the product of the magnitudes of analog signals $V_1$ and $V_2$.

The variable time circuit 30, which is preferably constructed as shown in FIG. 3, includes a NAND gate 50 which, when properly conditioned, serves to apply binary "1" signals at frequency $F_1$ to a conventional pulse counter 52 for counting a predetermined number of pulses during which a bistable multivibrator circuit 54 actuates the field effect transistor 38 to its conductive condition. Circuit 30 also includes a multivibrator circuit 56, a NAND gate 58, another NAND gate 60, and an inverter amplifier 62. The output frequency signal $F_1$ from comparator 20 is applied to one input each of NAND gates 50, 58 and 60. The output frequency signal $F_2$ of comparator circuit 32 is applied to one input of NAND gate 60 and through an inverter amplifier 62 to one input of NAND gate 58. The output of NAND gate 58 is applied to one input of an inverted OR gate 64 having its output circuit connected to one input of a second inverted OR gate 66. Inverted OR gates 64 and 66 are connected together so as to define the bistable multivibrator circuit 56. The output of multivibrator circuit 56 is taken from the output circuit of OR gate 66 and is applied as the third input to NAND gate 60. The output of NAND circuit 60 is, in turn, applied to one input of an inverted OR gate 68 having its output circuit connected to one input of another inverted OR gate 70. OR gates 68 and 70 are connected together so as to define multivibrator circuit 54. The output circuit of OR gate 68 is connected to the gate of the field effect transistor 38 and to a second input of NAND gate 50. The output circuit of counter 52 is connected to one input of OR gate 70 through a capacitor 72, providing a reset circuit for resetting multivibrator circuit 54 once a counting function has been completed.

In operation, the variable time circuit 30 receives pulses from comparator 20 at a frequency $F_1$ and pulses from comparator 32 at a frequency $F_2$. For purposes of the description herein, each frequency pulse will be considered as a binary "1" signal, whereas the absence of a frequency pulse will be considered as a binary "0" signal. As will be described in detail below, circuit 30 requires that a binary "1" signal from comparator 32 be received prior to a binary "1" signal from comparator 20, and then when both signals are concurrently present, counter 52 will commence its counting function to count a predetermined number N of pulses occurring at frequency $F_1$. While the counter is counting, the field effect transistor 38 is actuated to its conductive condition so that capacitor 34 in the converter circuit 12 (see FIG. 2) discharges. When N pulses have been counted, multivibrator circuit 54 will change its state, by virtue of a reset pulse applied through capacitor 72, to actuate the field effect transistor 38 to its nonconductive condition. Capacitor 34 in the converting circuit 12 will then charge at a rate dependent on the magnitude of analog signal $V_2$ until the charge attains a level required for the comparator circuit 32 to provide another output signal, causing the variable time circuit 30 to again actuate the field effect transistor 38 for a period in dependence upon N pulses at frequency $F_1$. Consequently, the output signal pulses attained from comparator 32 will exhibit a frequency $F_2$ proportional to the product of the magnitudes of analog signals $V_1$ and $V_2$.

If capacitor 34, in the converting circuit 12, is still being charged, the output circuit of comparator 32 will carry a binary "0" signal. If, at this time, no frequency pulse is obtained from converter circuit 10 then variable time circuit 30 receives binary "0" signals from comparators 20 and 32. During this condition, the output circuit of multivibrator circuit 56 carries a binary "1" signal and this is applied to NAND gate 60. Consequently, NAND gate 60 applies a binary "1" signal to the inverted OR gate 68 of the bistable multivibrator circuit 54. OR gate 68, in turn, applies a binary "0" signal to the gate of field effect transistor 38, so that this transistor is nonconductive, and a binary "0" signal to NAND gate 50. If comparator 20 now applies a frequency pulse or a binary "1" signal to NAND gate 50 no change will occur in the output circuit of NAND gate 50 and, consequently, counter 52 will not commence its counting function. However, if a frequency signal pulse is obtained from comparator circuit 20 and no pulse is present from comparator circuit 32, then the output circuit of OR gate 66 applies a binary "0" signal to one input of NAND gate 60. This will prevent the multivibrator circuit 54 from changing its state if a subsequent binary "1" signal is received from comparator 32 during the time duration of the pulse from comparator 20. This prevents counter 52 from commencing its counting function in the event pulses from comparators 20 and 30 are concurrent but the pulse from comparator 20 is received prior to that of the pulse from comparator 32.

When a frequency signal pulse is received from comparator 32 and none is received from comparator 20, then the output circuit of OR gate 66 applies a binary "1" signal to NAND gate 60 which also receives a binary "1" signal from comparator 32. Consequently, multivibrator circuit 54 will not change its state and continues to apply binary "0" signals to both the field effect transistor 38 as well as to the enabling input of the NAND gate 50. Since capacitor 34 continues to charge during this period, the output binary "1" signal from comparator 32 will be maintained until the capacitor is discharged sufficiently in the opposite direction. Consequently, comparator 32 continues to apply a binary "1" signal to the variable time circuit 30. Under these conditions, once comparator circuit 20 provides a binary "1" signal all three input circuits of NAND gate 60 will be receiving binary "1" signals. NAND gate 60 now applies a binary "0" signal to the multivibrator circuit 54 to cause it to change its state, whereupon it applies a binary "1" signal to actuate the field effect transistor 38 to its conductive condition. The multivibrator will remain in this state until a binary "1" reset signal pulse is applied to one input of OR gate 70 through reset capacitor 72. Also, when the multivibrator circuit 54 changed state it applied a binary "1" signal to the enabling input of NAND gate 50 and since both inputs of this gate receive binary "1" signals, its output circuit drops from a positive level to substantially ground potential for a duration dependent upon the time duration of a frequency signal pulse from comparator 20. On the first such pulse, the output circuit of counter 52 changes its state from a binary "1" condition to a binary "0" condition. The counter then proceeds to count N pulses at a frequency $F_1$ and when the number of pulses has reached a count of N, the counter's output circuit carries a steady state binary "1" signal and, on the leading edge of this signal, a reset pulse is applied through capacitor 72 to reset the multivibrator 54. Thus, the output circuit of the multivibrator as taken from the output of OR gate 68 reverts to a binary "0" condition to thereby actuate the field effect transistor 38 to its nonconductive condition and applies a binary "0" signal to the enabling input of NAND gate 50. Since field effect transistor 38 is now conductive, capacitor 34 in the converting circuit 12 will charge at a rate dependent upon the magnitude of analog signal $V_2$ until it attains the required level for comparator circuit 32 to provide an output signal so that the foregoing cycle of operation is repeated.

From the foregoing description it is seen that the field effect transistor 38 is cyclically actuated to a conductive condition for a time period T which, in turn, is inversely proportional to frequency $F_1$ or analog signal $V_1$. The frequency $F_2$ at which field effect transistor 38 is actuated into conduction is dependent on the ratio of the magnitude of signal $V_2$ and time period T; that is, frequency $F_2$ is proportional to $V_2/T$. Since the time period T is inversely proportional to analog signal $V_1$, then frequency $F_2$ is proportional to the product of the magnitudes of analog signals $V_1$ and $V_2$.

The foregoing description of the operation of the multiplier circuit may be more readily understood by reference to the following equations:

$$V_2/R_{37} = V_R'/R_{40} (f_2) (t_2)$$

(equation 1)

where:

$V_2$ = applied analog signal $R_{37}$ = resistor 37

$V_R'$ = reference analog signal $R_{40}$ = resistor 40

$f_2$ = frequency of output pulses from comparator 32

$t_2$ = time duration of output signal from circuit 30

Since $R_{37}$, $R_{40}$ and $V_R'$ are constants ($k_1$), then:

$$V_2 = k_1 (f_2) (t_2)$$

(equation 2)

Also, $$V_1/R_{18} = V_R/R_{26} (f_1) (t_1)$$

(equation 3)

where:

$V_1$ = applied analog signal $R_{18}$ = resistor 18

$V_R$ = reference analog signal $R_{26}$ = resistor 26

$f_1$ = frequency of output pulses from comparator 20

$t_1$ = time duration of output signal from circuit 22 since $R_{18}$, $R_{26}$ and $V_R$ are constants ($k_2$), then:

$$V_1 = k_2 (f_1) (t_1)$$

(equation 4)

but, $$t_2 = k \, 1/f_1$$

(equation 5)

and, $$f_1 = k \, V_1$$

(equation 6)

substituting terms in equations 2 and 5:

$$V_2 = k_3 (f_2) (1/f_1)$$

(equation 7)

substituting terms in equations 6 and 7:

$$V_2 = k_4 (f_2) (1/V_1)$$

(equation 8)

or $$f_2 = k_4 (V_1) (V_2)$$

(equation 9)

From the foregoing it is seen that if signals $V_R$ and $V_R'$ be held constant, then the output frequency $F_2$ is proportional to the product of the magnitudes of signals $V_1$ and $V_2$.

MODIFICATIONS

The description given thus far with reference to FIGS. 1, 2 and 3 has been made in the context of multiplying two analog signals $V_1$ and $V_2$. It is contemplated, however, that the invention be employed for purposes of raising an analog signal to two or more powers by multiplying the signal by itself. It is also contemplated that the reference voltages, such as voltages $V_R$ and $V_R'$ in FIG. 2, be either of the same magnitude or of different magnitudes. Reference is now made to FIG. 4 which illustrates circuitry similar to the circuitry shown in FIG. 2 and, consequently, for purposes of simplying the description of the invention herein, similar circuits in both FIGURES are identified with like reference characters. Thus, multiplier circuit M' of FIG. 4, like multiplier circuit M of FIG. 2, employs an analog to frequency signal converter 10 having its output frequency signal $F_1$ applied to a second analog to frequency signal converter 12. Since multiplier M' may be employed to multiply three analog signals or to multiply a signal by itself to the third power, the output frequency signal $F_2$ of converter 12 is applied to another converter 12' constructed in the same fashion as converter 12 described in detail hereinbefore with reference to FIGS. 2 and 3. In this case, the output circuit of converter 12' will carry an output frequency signal $F_3$.

If circuit M' is utilized for multiplying three analog signals $V_1$, $V_2$ and $V_3$, then switches 100, 102 will be actuated so as to apply analog signal $V_1$ to converter 10, analog signal $V_2$ to converter 12 and analog signal $V_3$ to converter 12'. The reference voltages $V_R$, $V_R'$ and $V_R''$ are respectively of opposite polarity from analog voltage signals $V_1$, $V_2$ and $V_3$. If desired, the same reference voltage $V_R$ may be used with each converter circuit by suitably actuating switches 104, 106. Also if desired, switches 104 and 106 may be actuated so that reference voltages $V_R$, $V_R'$ and $V_R''$ are respectively applied to converters 10, 12 and 12'. With switches 100 and 102 actuated so that all three voltages $V_1$, $V_2$ and $V_3$ are applied to the multiplier circuit M', then the output frequency signal $F_3$ of converter circuit 12' will exhibit a frequency proportional to the product of the magnitudes of the three analog signals. If desired, analog signal $V_1$ may be raised to its third power by manipulating switches 100 and 102 so that signal $V_1$ is applied to each of the converters 10, 12 and 12'. In this case, the output frequency signal $F_3$ will exhibit a frequency proportional to the third power of the magnitude of analog signal $V_1$.

The previous descriptions have been given with respect to multiplying signal $V_1$ by itself or by signal $V_2$ and or by signal $V_3$. The invention also contemplates that the output frequency be proportional to the ratio of two analog signals (a divider) or the product of the reciprocals of two or more analog signals. For example if signals $V_R$ and $V_2$ be constant and signals $V_R'$ and $V_1$ are variables, then equation 1 may be solved for $V_R'$ as:

$$V_R' = (k_5) \, 1/[(f_2)(t_2)]$$

(equation 10)

substituting terms from equation 5 for $t_2$ in equation 10, leaves $$V_R' = (k_6) \, f_1/f_2$$

(equation 11)

substituting terms from equation 6 for $f_1$ in equation 11, leaves $$V_R' = [(k_7)(V_1)]/f_2$$

(equation 12)

or $$f_2 = (k_7) \, V_1/V_R'$$

(equation 13)

From the foregoing equations it is seen that with signals $V_R$ and $V_2$ held constant, the output frequency is proportional to the ratio of the magnitude of signal $V_1$ to that of signal $V_R'$.

If, however, signals $V_R'$ and $V_1$ be constant then substituting terms in equations 2 and 5 leaves:

$$V_2 = (k_8) \, f_2/f_1$$

(equation 14)

from equation 3

$$f_1 = (k_9) \, 1/V_R$$

(equation 15)

Hence, $$V_2 = (k_{10})(f_2)(V_R)$$

(equation 16)

or $$f_2 = (k_{10}) \, V_2/V_R$$

(equation 17)

From the foregoing equations it is seen that with signals $V_R'$ and $V_1$ held constant, the output frequency is proportional to the ratio of the magnitude of signal $V_2$ to that of signal $V_R$.

If signals $V_1$ and $V_2$ be held constant, then equation 1 may be solved for $V_R'$ as:

$$V_R' = (K_{11})(1/t_2)(1/f_2)$$

(equation 18)

substituting terms from equation 5, then equation 18 may be written as:

$$V_R' = (k_{12})(f_1)(1/f_2)$$

(equation 19)

and substituting terms from equation 15, leaves:

$$V_R' = (k_{13})(1/V_R)(1/f_2)$$

(equation 20)

or $$f_2 = (k_{13}) \, 1/[(V_R)(V_R')]$$

(equation 21)

Thus, from the foregoing equations it is seen that if signals $V_1$ and $V_2$ be constant, the output frequency is proportional to the product of the reciprocal of the magnitude of signal $V_R$ and that of signal $V_R'$.

The invention has been described with reference to a preferred embodiment, however, it is to be appreciated that the invention is not limited to same as various modifications may be made without departing from the spirit and scope of the invention as defined in the appended claims.

What is claimed is:

1. A multiplier circuit for providing an output frequency signal having a frequency proportional to the product of functions of first and second analog signals, and comprising:

first analog to frequency signal converting means for receiving a said first analog signal and providing a first frequency signal exhibiting a frequency proportional to a function of said first analog signal;

second analog to frequency signal converting means for receiving said second analog signal and said first frequency signal and providing therefrom a second frequency signal having a frequency proportional to the product of a function of said first signal and a function of said second analog signal, said second converting means includes charging circuit means having energy storage means for receiving said second analog signal for charging said energy storage means at a rate dependent on the magnitude of said second analog signal, and means for providing an output signal when the storage means is charged to a predetermined level;

means responsive to said output signal and to said first frequency signal for discharging said energy storage means for a time period inversely proportional to the frequency of said first output frequency signal so that said output signal serves as said second output frequency signal.

2. A multiplier circuit as set forth in claim 1, wherein said discharging means includes:

a reference source of energy;

actuatable switching means for, when actuated, connecting said source with said storage means to discharge said storage means, and switch control means for actuating said switching means to discharge said storage means for a time period dependent upon the frequency of said first output frequency signal.

3. A multiplier circuit as set forth in claim 2, wherein said switch control means includes circuit means for actuating said switching means only in response to the concurrent occurrence of a said first frequency signal and a said output signal.

4. A multiplier circuit as set forth in claim 3, wherein said circuit means includes means for preventing actuation of said switching means unless said output signal is received before that of said first frequency signal.

5. A multiplier circuit as set forth in claim 2, wherein said switch control means includes means for timing said time period so as to be inversely proportional to the frequency of said first output frequency signal.

6. A multiplier circuit as set forth in claim 5, wherein said timing means includes pulse counter means for counting a predetermined number of signal pulses occurring at the frequency of said first output frequency signal and providing an output indication when said predetermined number of pulses have been counted.

7. A multiplier circuit as set forth in claim 6, including circuit means controlled by said counter means for actuating said switching means during the counting operation until said counter means provides a said output indication.

8. A multiplier circuit as set forth in claim 7, wherein said first analog to frequency signal converter means includes an energy storage means for storing energy at a rate dependent on the magnitude of said first analog signal, comparing means for providing an output pulse signal when the energy stored by storage means attains a predetermined level, and discharge circuit means responds to each said output pulse signal for discharging said energy storage means at a substantially constant rate and for a fixed period of time.

9. An analog to frequency signal converter comprising:
   charging circuit means including energy storage means for receiving an analog signal for charging said energy storage means at a rate dependent upon the magnitude of said analog signal;
   means for providing an output signal pulse when said storage means is charged to a predetermined level;
   means for providing a frequency signal; and
   means responsive to said output signal pulse and to said frequency signal for discharging said energy storage means at a substantially constant rate for a time period inversely proportional to the frequency of said frequency signal so that the said output signal pulse occurs at a frequency dependent on the magnitude of said analog signal and the frequency of said frequency signal.

10. A multiplier circuit for providing an output frequency signal having a frequency proportional to the product of a first analog signal and N analog signals, where N is at least 2, and comprising:

first analog to frequency signal converting means for receiving a said first analog signal and providing a first output frequency signal exhibiting a frequency proportional to the magnitude of said first analog signal;
   N second analog signal to frequency converting means for respectively receiving an associated one of N analog signals, each said second converting means including:
   charging circuit means including energy storage means for receiving an associated one of said N analog signals for charging said energy storage means at a rate dependent on the magnitude of said associated signal;
   means for providing an output signal when said storage means is charged to a predetermined level; and
   means responsive to said output signal and to said first output frequency signal for discharging said energy storage means at a substantially constant rate for a time period inversely proportional to the frequency of said first output frequency signal so that said output signal exhibits a frequency proportional to the product of said first analog signal and said associated analog signal; and
   circuit means for applying the output signal of a preceding one of said second converting means to the output signal responsive means of the next succeeding second converting means.

11. A method for providing an output frequency signal exhibiting a frequency proportional to the product of the magnitudes of at least two analog signals and comprising the steps of:
   electrically converting the first of said analog signals into a frequency signal exhibiting a frequency proportional to the magnitude of said first analog signal;
   charging a capacitor at a rate dependent on the magnitude of the second of said analog signals until the capacitor has attained a predetermined charge;
   discharging the capacitor for a time duration inversely proportional to the frequency of the first output frequency signal; and
   continuing the preceding steps of charging and discharging the capacitor and providing an output signal pulse each time the capacitor attains a charge equal to said predetermined level so as to provide a train of pulses which exhibits a frequency proportional to the product of the magnitudes of said analog signals.

* * * * *